United States Patent [19]
Muench

[11] Patent Number: 5,953,156
[45] Date of Patent: Sep. 14, 1999

[54] AUTOSTEREOSCOPIC VIEWING SYSTEM AND ITS METHOD OF USE

[75] Inventor: Paul L. Muench, Livonia, Mich.

[73] Assignee: The United States of America as represented by the Secretary of the Army, Washington, D.C.

[21] Appl. No.: 09/107,580

[22] Filed: May 13, 1998

[51] Int. Cl.⁶ .............................. G02B 27/22; G03B 21/00
[52] U.S. Cl. ................................. 359/464; 353/7
[58] Field of Search .................................. 359/19, 20, 26, 359/208, 464, 462; 352/57, 61, 65; 353/7

[56] References Cited

U.S. PATENT DOCUMENTS

| | | | |
|---|---|---|---|
| 4,799,739 | 1/1989 | Newswanger | 350/3.7 |
| 5,311,220 | 5/1994 | Eichenlaub | 348/55 |
| 5,521,724 | 5/1996 | Shires | 359/23 |

FOREIGN PATENT DOCUMENTS

| | | | |
|---|---|---|---|
| 2043289A | 9/1980 | United Kingdom | 353/7 |

*Primary Examiner*—Cassandra Spyrou
*Assistant Examiner*—Fayez Assaf
*Attorney, Agent, or Firm*—Peter A. Taucher; David L. Kuhn

[57] ABSTRACT

A method to create a holographic projection adjusts both for relatively small and relatively large head movements of the human viewer. Basically, the method includes sending sequences of images on an optical path from a projector to an eyebox array, the images in the sequences being views of the object from different angles. In the method's first step, the sequences of images are sent to a quasi-cylindrical mirror having two or more arcuate zones. Each zone corresponds to a particular range of viewer head positions and to a particular sequence of images, and each image reflects from a different, characteristic location in its associated zone. Once the images reflect from the quasi-cylindrical mirror, they pass through an HOE in the optical path to the eyebox array. Any given sequence of images is sufficient for an eyebox array whose width accommodates relatively small head, motions of the viewer. Accommodating larger movements of the viewer's head is done by tracking the viewer's head and directing light rays from the projector in response to these movements.

9 Claims, 5 Drawing Sheets

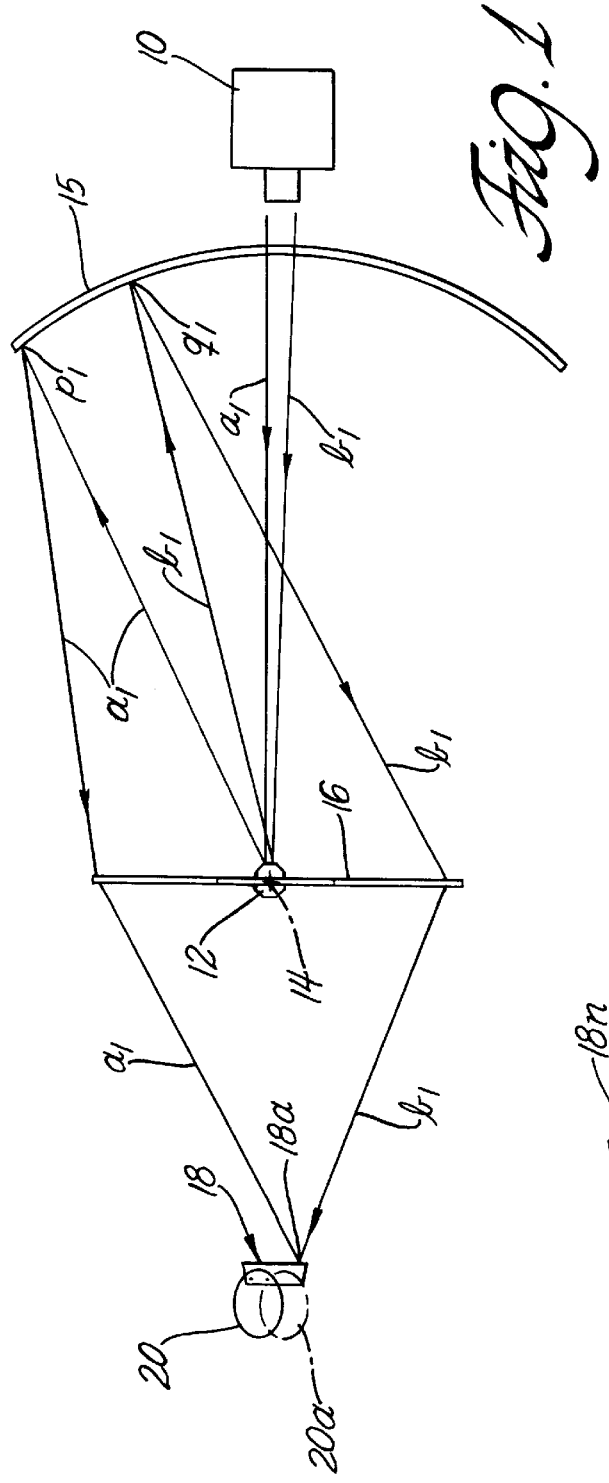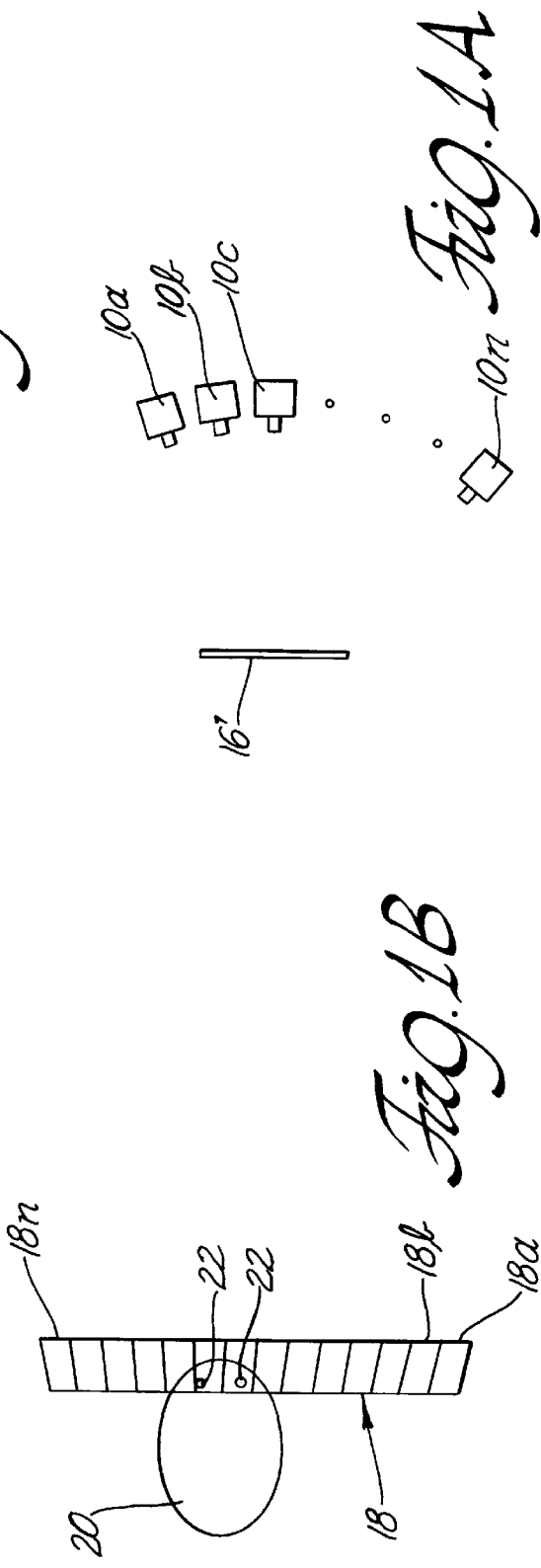

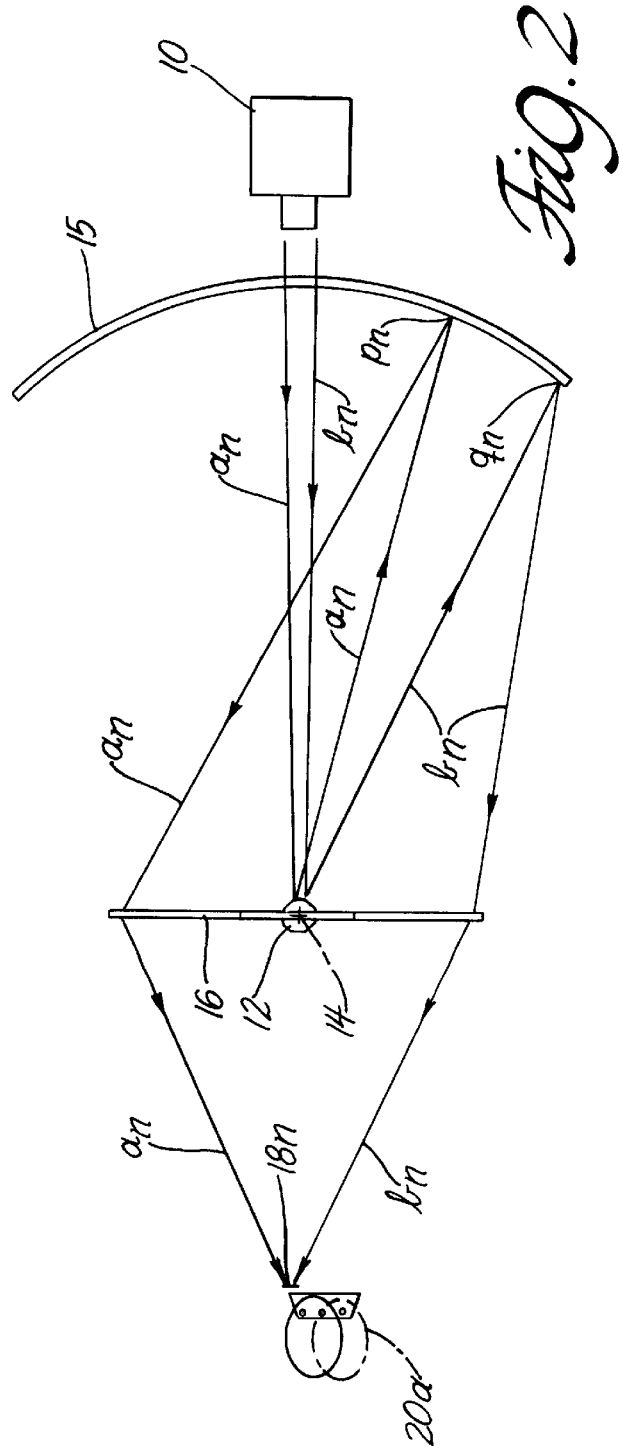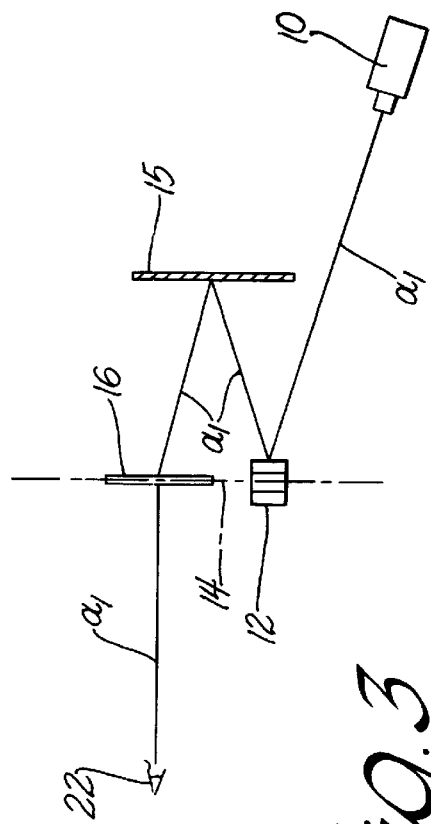

5,953,156

AUTOSTEREOSCOPIC VIEWING SYSTEM AND ITS METHOD OF USE

GOVERNMENT USE

The invention described here may be made, used and licensed by or for the U.S. Government for governmental purposes without paying me any royalty.

BACKGROUND AND SUMMARY

For holographic projections, one desires to increase the size of the spatial envelope and the quantity of eyeboxes arrayed within the envelope, whereby the viewer has a bigger zone in which to experience parallax. One important advance in this area is shown by U.S. Pat. No. 4,799,739 to Newswanger. There, a holographic optical element is used as a projection screen for a multiplicity of projectors. The projectors are placed so eyeboxes where their images are seen become horizontally contiguous, thereby achieving a parallax effect. My viewing system improves upon Newswanger's concept. My system is less bulky and complex in that only one projector is used, and my system lets viewers see a perspective change over a greater range of head movement than does Newswanger. Further, my system adjusts both for relatively small and relatively large head movements of the human viewer.

In my method, sequences of images are sent very rapidly from a projector, the images being views of a scene or object from different angles of perspective. The images may go directly to an arcuate mirror from a projector which pivots to aim at varied locations on the arcuate mirror. But preferably, the projector is stationary and the images are sent from it to a spinning polygonal mirror, which reflects the images to the arcuate mirror. A flat mirror, which pivots in response to viewer head motion, receives the images from the arcuate mirror and reflects them back to an appropriate zone of the arcuate mirror.

The arcuate mirror has a multiplicity of these zones. Each zone is dedicated to a particular range of viewer head positions and to a particular sequence of images; each image reflects from a different, characteristic location within its dedicated zone. Once images reflect from the appropriate zone of the arcuate mirror, they pass through a holographic optical element (HOE) to create an eyebox array. In my system, any given sequence of images creates an array of eyeboxes whose width accommodates relatively small sideways head motions of the viewer. Since the eyeboxes are densely packed, they create fine parallax for the viewer. Adapting to larger head motions is done by coordinating the sequence of images with the flat mirror's position.

BRIEF DESCRIPTION OF THE DRAWINGS

FIG. 1 is a plan view of a simplified version of my system showing the paths of light rays from a first image in a sequence of images.

FIG. 1A shows an array of projectors emulated by the FIG. 1 system.

FIG. 1B is an enlargement of a portion of FIG. 1 schematically showing a viewer's head and eyes and an eyebox associated at the viewer's eyes.

FIG. 2 is a plan view of the simplified version of my system showing the paths of light rays from an nth image in a sequence of images.

FIG. 3 is a side elevational view of the system in FIG. 1, where the path of ray $a_1$ is shown.

DETAILED DESCRIPTION

Figure 4:
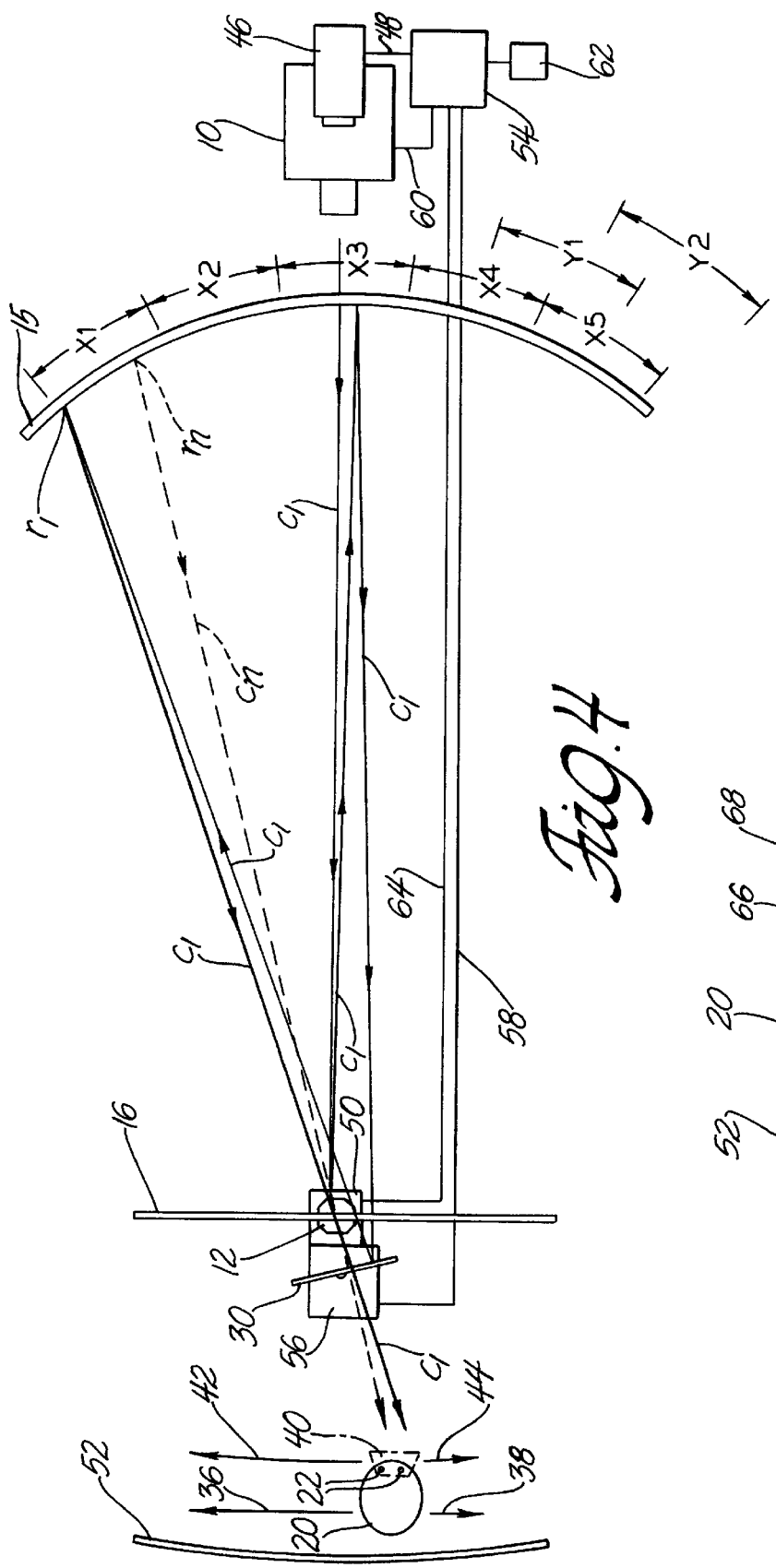
FIG. 4 is a plan view of a more complex version of my system showing the path of a light ray from a given image in a first sequence of images.

FIGS. 1 through 3 show one aspect of my viewing system, which uses a single high speed projector 10 instead of the known array of projectors as contemplated by Newswanger in U.S. Pat. No. 4,799,739. In FIG. 1, projector 10 sends out a given image with rays $a_1$ and $b_1$ at lateral edges of the image. Rays $a_1$ and $b_1$ strike a rotatable multi-faceted mirror 12, which is typically polygonal and spins counterclockwise about axis 14. Rays $a_1$ and $b_1$ reflect from mirror 12 to the concave side of an arcuate, quasi-cylindrical mirror 15, striking respective points $p_1$ and $q_1$. Rays $a_1$ and $b_1$ are then reflected to a holographic optical element, or HOE, at 16. Preferably HOE 16 is located such that a line through its center axially aligns with turning axis 14 of mirror 12 and the central axis of mirror 15.

After passing through HOE 16, the rays travel to a subarray 18a of eyeboxes that form a part of a greater eyebox array 18, where a schematically represented human viewer 20 has eyes 22 (FIG. 1B) positioned in eyebox array 18. Eyebox array 18 is a spatial envelope wider than the distance between viewer's eyes 22 so both eyes can be placed therein. A multitude of eyeboxes, examples of which are 18a, 18b, and 18n exist in the greater eyebox array 18. Each eyebox has a different perspective view. Consequently, viewer 20 receives an autostereoscopic image with parallax from HOE 16. As explained below in conjunction with FIGS. 1B and 2, when mirror 12 rotates, the rays from HOE 16 shift from eyebox 18a to eyebox 18b within the greater eyebox array 18 and on to eyebox 18n. Thus, slight lateral movement of the viewer's head will not remove eyes 22 from greater eyebox array 18, but will allow viewer 20 to see a slightly different perspective of the object or scene viewed. Depending on its specific configuration, the FIG. 1 system allows viewer 20 to move right or left one-half inch to several inches and still see a holographic image through HOE 16 at a perspective changing correctly with viewer motion. The concept of my system is similar to that of a composite or multiplex hologram, where a number of photographs are composited onto a single hologram.

For any given frame of a holographic motion picture, projector 10 outputs a sequence of n component images in concert with motion of mirror 12 so as to imitate the effect of a multiplicity, n, of projectors arrayed angularly about an HOE, as shown in FIG. 1A. The first component image from projector 10 occurs during a first angular position of mirror 12, which is shown in FIG. 1. This first component image is the same as the image from projector 10a in FIG. 1A, which is sent directly to HOE 16' in that figure. That is, the first component image received by HOE 16 is the same as, and strikes at the same angle as, the image received by HOE 16' from projector 10a.

Immediately after projector 10 sends the first component image, mirror 12 turns to a new, second angular position and projector 10 sends a second component image. The second component image from projector 10 will be the same as, and will strike at the same incident angle as, the image from projector 10b in FIG. 1A. Similarly, the third component image 10 will be the same as the image from projector 10c in FIG. 1A. Projector 10 and mirror 12 continue in the foregoing fashion until projector 10 sends its nth image component and mirror 12 turns to its nth angular position. Like the previous images, the nth component image received by HOE 16 is the same as, and strikes at the same incident angle as, the image received by HOE 16' from projector 10n in FIG. 1A.

FIG. 2 shows the position of mirror 12 and the paths of rays from projector 10 when projector 10 sends its nth component image. There, the nth image has rays $a_n$ and $b_n$ at its lateral edges. Rays $a_n$ and $b_n$ strike mirror 12, and reflect therefrom to strike quasi-cylindrical mirror 15 at respective points $p_n$ and $q_n$. Rays an and $b_n$ are then reflected through HOE 16 toward eyebox subarray 18n of array 18 and toward eyes 22 of viewer 20.

After projector 10 sends out its nth component image for a given frame, it sends out the first component image for the next frame and sends the sequence of n component images for that next frame. I envision that n will normally be no more than 30, but higher values for n may be possible. It will be noted that projector 10 sends out its programmed sequence of component images rapidly enough so that viewer perceives a steady image at the viewer's position at 20, at 20a or at any position in between.

Figure 5:
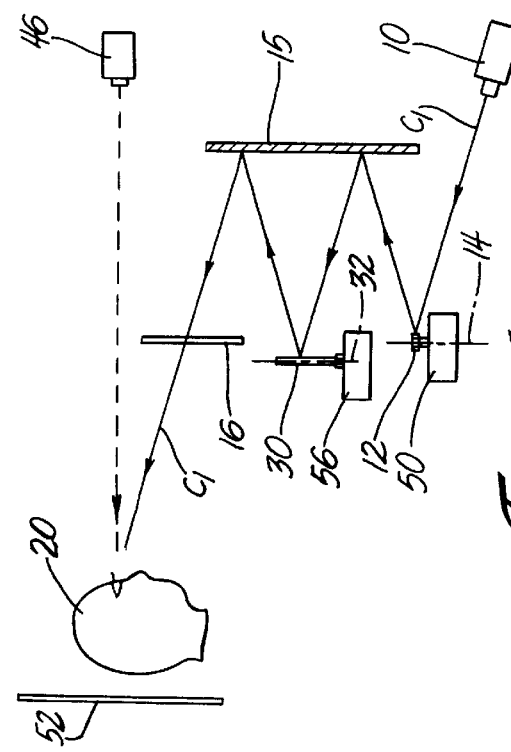
FIG. 5 is a side elevational view of the system shown in FIG. 4 with the computer and associated signal communication lines removed.
Figure 6:
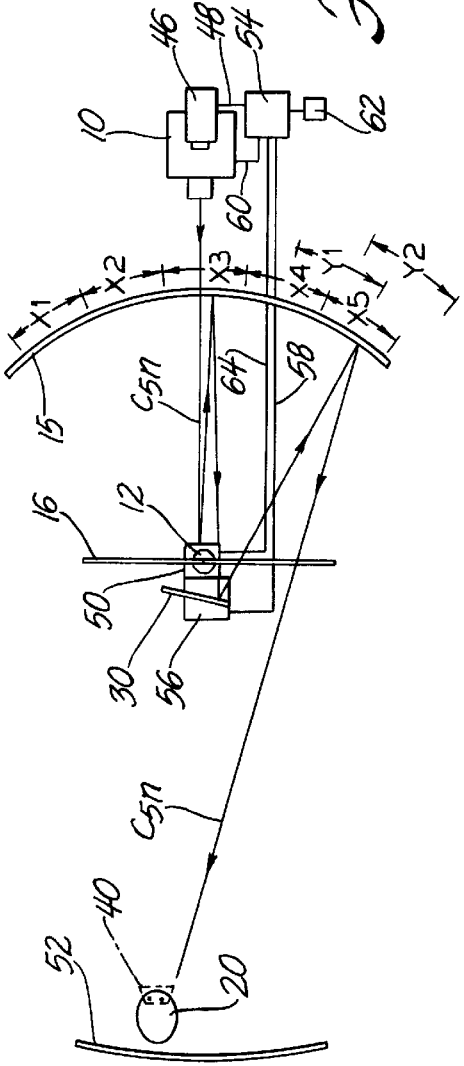
FIG. 6 is a plan view of the more complex version of my system showing the path of a light ray from the given image in an nth sequence of images.

In FIGS. 4, 5 and 6 is shown a more complex autostereoscopic viewing system having projector 10, polygonal mirror 12, quasi-cylindrical mirror 15, and HOE 16 together with a new element, flat mirror 30, which can be turned on axis 32. For purposes of convenience and clarity of illustration, Hoe 16, mirror 12 and mirror 30 are not shown as being axially aligned in FIGS. 4, 5 and 6. It is preferred, though, that these elements be so aligned. It is contemplated that these elements would typically be vertically axially aligned with axis 14, which is preferably coaxial with the central axis of mirror 15. Also for convenience, only one ray, $c_1$, is shown for a first component image coming from projector 10 in FIG. 4.

Ray $c_1$ originates from projector 10, reflects from mirror 12, reflects from flat mirror 30, reflects a final time from mirror 15, passes through HOE 16 and enters the observer's eye 22. If mirror 30 remains stationary in the FIG. 4 position, then each occurrence of ray $c_1$ from projector 10 will reflect to HOE 16 from a final departure point $r_1$ on mirror 15. Ray $c_1$ is a ray of a first component image in the same way that rays $a_1$ and $b_1$ are rays of a first component image in FIG. 1.

In the way as described in conjunction with FIGS. 1 through 3, projector 10 in FIG. 4 will send out a sequence of n component images in concert with the motion of mirror 12. The effect will be that of a set of n projectors arrayed along an arcuate portion of mirror 15 dimensioned as x1 in FIG. 4, analogous to the arrayed projectors in FIG. 1A. Note that the nth composite image will have a ray that ultimately reflects to HOE 16 from final departure point $r_n$ on mirror 15. A segment of that ray is shown by a dashed line at $c_n$.

As mirror 30 turns on its axis 32, rays from projector 10 still strike mirror 12, reflect off mirror 15 to mirror 30 and then reflect again to mirror 15, from whence the rays undergo a final reflection toward HOE 16. However, due to changes in position of mirror 30, the rays' final reflection is off a new zone of mirror 15. For example, if mirror 30 turns a certain slight angular distance clockwise in FIG. 4, then rays from projector 10 will reflect to HOE 16 from arcuate portion x2 of mirror 15. Continued movements of the same angular increments will cause rays from projector 10 to be reflected to HOE 16 from respective zones x3, x4 and x5 of mirror 15. For each zone x1 through x5, projector 10 sends out a different set of n component images. The effect will be analogous to that of a set of 5n projectors arrayed all along mirror 15. In another manner of speaking, the effect is analogous to the that of the arrayed projectors in FIG. 1A, except that there are 5 times as many projectors.

Of course, the number of arcuate zones into which mirror 15 is divided can be greater or less than 5. It will also be understood that mirror 30 can be turned on axis 30 in various increments, whereby rays originating from projector 10 can ultimately be reflected from any arcuate zone on mirror 15 having the same angular width as zones x1 through x5. For example, mirror 30 can be turned so that rays from projector 10 ultimately reflect from zones y1 or y2 in FIG. 4. In FIG. 6, viewer 20 has moved sideways to the maximum extent in direction 36 from the FIG. 4 position. A ray $c_{5n}$, an analog of ray $c_1$ in FIG. 4, reflects from zone x5 of mirror 15 through HOE 16 to viewer 20.

A control device such as computer 54 coordinates projector 10 and motor 56 which turns mirror 30. Computer 54 sends control signals to motor 56 over line 58 and video signals to projector 10 over line 60. The video signals represent component images for frames of holographic motion pictures, the frames being stored in a memory 62. The control signals for any angular position of mirror 30 on axis 32 correspond to the video signals for the appropriate arcuate zone of mirror 30. Thus, for example, when mirror 15 is positioned so that HOE 16 receives rays from zone x1, projector 10 will receive one set of video signals; but when mirror 15 is positioned so that HOE receives rays from zone x2, projector 10 will receive a second, completely different, set of video signals. In similar fashion, projector 10 receives completely different sets of video signals when HOE 16 receives rays from zones x3, x4 and x5. If mirror 30 is positioned so that HOE 16 receives rays from adjacent arcuate zones, then projector 10 will receive video signals corresponding to the appropriate parts of the adjacent zones. For example, if mirror 30 is positioned so that HOE 16 receives rays from arcuate zone y1, then projector 10 will receive video signals corresponding to the appropriate parts of zones x4 and x5.

Computer 54 sends the coordinated control signals and video signals in response too input signals over line 48 from camera 46, which tracks the position of the head of viewer 20. Computer 54 can also coordinate the motion of mirror 12 with projector 10 and mirror 30. This is done by means of appropriate signals from computer 54 over line 64 to motor 50, which moves mirror 12.

As the viewer's head moves sideways in directions 36 or 38 (FIG. 4), the camera's input signals cause the projector to continuously change its sequence of n component images in concert with motion of mirror 30. Hence, the viewer perceives the holographic image at a continuously changing perspective correct for the viewer's position as the viewer's head moves.

Rays from projector 10 always arrive at eyebox array 40, which moves along arcuate paths 42 or 44 to track with the viewer's head. It is contemplated that camera 46 will not need to detect relatively small head movements of, say, half an inch or less in directions 36 or 38. During such relatively small movements, the viewer's eyes remain in eyebox array 40, and the viewer senses no interruption in the images from projector 10.

Figure 8:
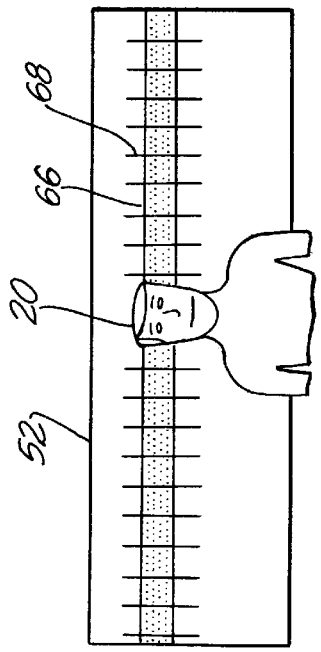
FIG. 8 shows a front elevational view of a screen used to assist tracking the viewer's head.

Optionally, part of the means to detect the position of the viewer's head could be a screen 52 behind viewer 20 at a known position relative to camera 46. As seen in FIG. 8, screen 52 has a contrast bar 66 at the height of the head of viewer 20, the bar colored to create visual contrast with the viewer's head. By detecting which portion of band 66 is blocked by the viewer's head, the camera or an associated image processor in computer 54 can determine the position of the viewer's head. Optionally, a set of calibration marks 68 can be placed along bar 66.

Figure 7:
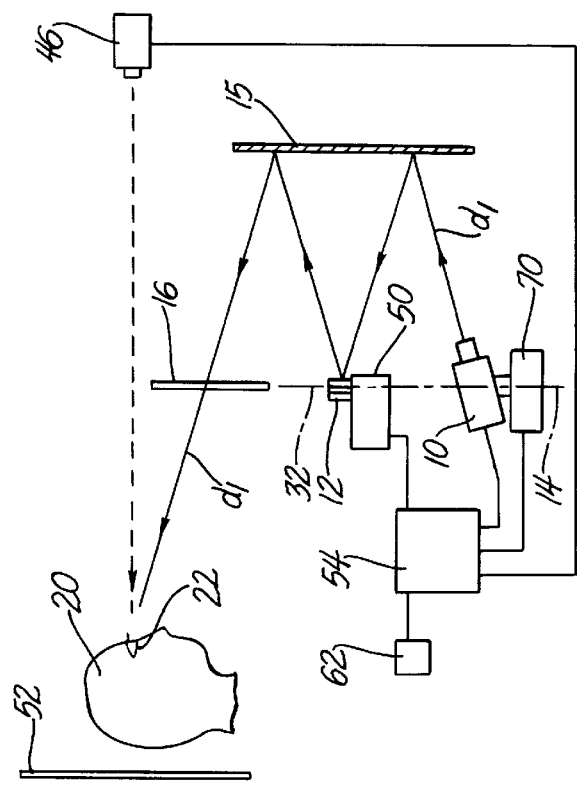
FIG. 7 is a side elevational view of an alternate to the system in FIGS. 4 through 6, where the path of ray $d_1$ is shown.

FIG. 7 is a modification of the system shown in FIGS. 4 through 6. In FIG. 7, flat mirror 30 has been eliminated and projector 10 is mounted on motor 70 for turning on axis 14. Otherwise, the FIG. 7 system is the same as shown in the prior figures. Projector 10 aims a ray $d_1$ directly at mirror 15 instead of reflecting that ray from a spinning polygonal mirror. The rotational position of projector is controlled by signals from computer 54 to motor 70 in the same fashion that the position of mirror 12 is controlled in the prior embodiment of my system.

Figure 9:
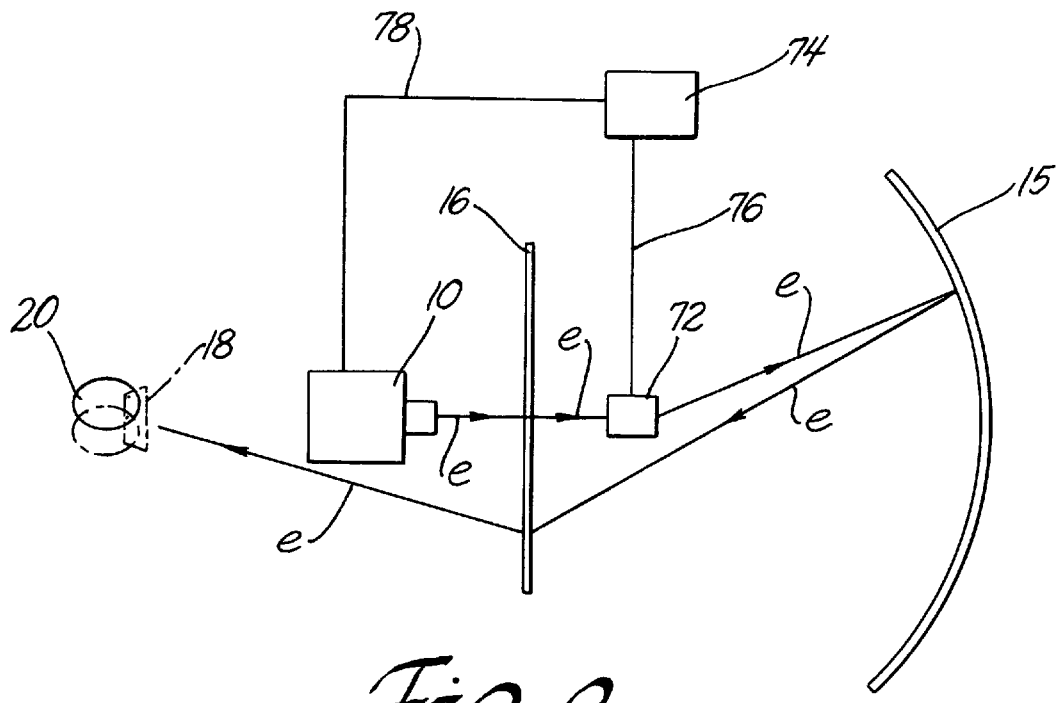
FIG. 9 is a plan elevational view of an alternate embodiment of my system that uses an electro-optical 'scanner.
Figure 10:
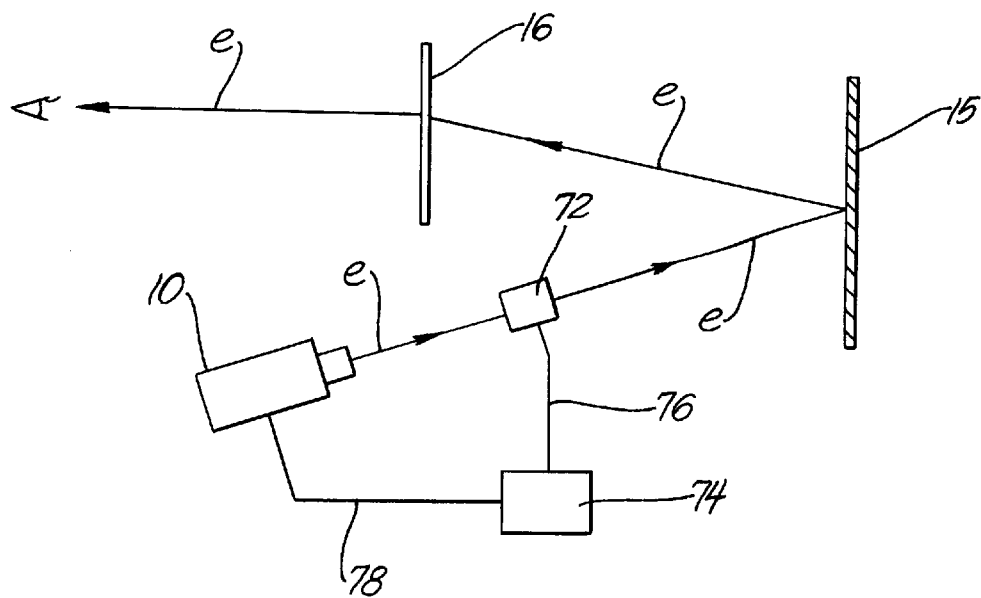
FIG. 10 is a side elevational view of the system shown in FIG. 9.

Shown respectively in FIGS. 9 and 10 are plan and side elevational view of an autosterebscopic viewing system that is a variation of the configuration of FIG. 1. The system of FIGS. 9 and 10 is similar to that of FIG. 1 except that spinning mirror 12 has been replaced by electro-optical scanner 72 and its associated controller 74. Also, for simplicity, FIGS. 9 and 10 depict the path of a single light ray e instead of the two rays $a_1$ and $b_1$ depicted in FIG. 1.

In FIGS. 9 and 10, projector 10 sends ray e through an electro-optical scanner 72, which refracts ray e by a degree which is a function of an electrical charge conveyed to scanner 74 from controller 72 over line 76. As a series of n composite images are sent from projector 10, the charges from controller vary in temporal concert with them, the variation typically governed by coordination signals travelling over line 78 between projector 10 and controller 74. Each composite image is directed by scanner 72 to a different zone of mirror 15, whereby electro-optical scanner 72 achieves the same effect as spinning mirror 12 of FIG. 1. It will be noted that other equivalents spinning mirror 12 besides scanner 72 can be used, such as, for example, acousto-optical modulators.

I wish it to be understood that I do not desire to be limited to the exact details of construction or method shown herein since obvious modifications will occur to those skilled in the relevant arts without departing from the spirit and scope of the following claims.

what is claimed is:

1. A method for creating holographic protjections for a human viewer, wherein the method compensates for head motion the viewer, the method comprising:

sending from a projector a sequence of images along an optical path to the viewer, any given image of the series representing a view of the projection from a different angle of perspective;

receiving the sequence of images from the projector at an arcuate mirror in the optical path, each image of the sequence reflecting from a different, characteristic location in a corresponding sequence of locations on the arcuate mirror;

passing the images reflected from the arcuate mirror through an HOE in the optical path to the viewer;

aiming the light rays of the images in coordination with the operation of the projector such that each of the images reflects from its characteristic location on the arcuate mirror.

2. The method of claim 1 further comprising:

dividing the arcuate mirror into contiguous arcuate zones, wherein each of the arcuate zones corresponds to a different range of viewer head positions;

storing a plurality of the sequences of the images in a memory, each of the sequences being associated with one of the arcuate zones;

wherein the projector sends selected images from one or more sequences simultaneously with the light rays reflecting from the corresponding locations of the arcuate zones.

3. A method for creating holographic projections for a human viewer, wherein the method adjusts both for relatively smaller head motions and relatively larger head motions of the viewer, the method comprising the steps of:

sending from a projector sequences of images along an optical path to an eyebox array surrounding the eyes of the viewer;

wherein any given image of one of the sequences represents a view of the projection from a different angle of perspective;

receiving the sequences of images from the projector at a mirror in the optical path;

dividing the mirror into two or more zones;

reserving a first zone for a first range of viewer head positions and a first sequence of images from the projector, each image in the first sequence of images reflecting from a characteristic location in the first zone;

reserving a second zone for a second range of viewer head positions and a second sequence of images from the projector, each image in the second sequence of images reflecting from a characteristic location in the second arcuate zone;

passing the images reflected from the mirror through an HOE in the optical path to the eyebox array;

compensating for the relatively smaller viewer head motions, the compensating step including aiming the light rays of one sequence of the images such that the images of the one sequence reflect from their characteristic locations on one of the zones, the compensating step further including making the eyebox array wider than the distance between the viewer's eyes;

tracking the position of the viewer's head;

redirecting light rays from the projector in response to relatively larger motions of the viewer's head;

storing a plurality of the sequences of the images, each of the sequences of images being associated with one of the zones;

wherein the projector sends images from the first sequence when the light rays reflect from the first zone and the projector sends images from the second sequence when the light rays reflect from the second zone.

4. The method of claim 3 wherein the mirror is a first mirror and the method further comprises:

interposing a second, rotatable mirror in the optical path downstream of the projector;

coordinating the motion of the rotatable mirror with the one sequence of the images from the projector;

using the rotatable mirror to direct the images of the first sequence to the first mirror.

5. The method of claim 4 further comprising:

reflecting the images from the first mirror to a pivotable mirror in the optical path;

turning the pivotable: mirror in response to changes in position of the viewer's head;

after the reflecting step and before the passing step, returning the images from the pivotable mirror to the first mirror.

6. A method for creating holographic projections for a human viewer, wherein the method adjusts both for relatively smaller head motions and relatively larger head motions of the viewer, the method comprising:

sending from a source one or more series of images along an optical path to the viewer, any given image of one of the series representing a view of the projection from a different angle of perspective;

receiving the series of images at a concave side of an arcuate mirror in the optical path;

dividing the arcuate mirror into two or more arcuate zones;

reserving a first arcuate zone for a first range of viewer head positions and a first series of images, each image in the first series of images reflecting from a different, characteristic location in a sequence of locations in the first arcuate zone;

reserving a second arcuate zone for a second range of viewer head positions and a second series of images, each image in the second series of images reflecting from a different, characteristic location in a sequence of locations in the second arcuate zone;

passing the images reflected from the arcuate mirror through an HOE in the optical path to the viewer;

compensating for the relatively smaller viewer head motions, the compensating step including aiming the light rays of one series of the images such that the images of the one series reflect from their characteristic locations on one of the arcuate zones;

tracking the position of the viewer's head;

redirecting light rays from the source in response to the relatively larger motions of the viewer's head;

storing a plurality of the series of the images, each of the series of images being associated with one of the arcuate zones.

7. The method of claim 6 wherein the mirror is a first mirror and the method further comprises:

interposing a second, rotatable polygonal mirror in the optical path immediately downstream of the source;

coordinating the motion of the polygonal mirror with a sequence of the images from the source;

directing the images to the first mirror with the polygonal mirror.

8. The method of claim 3 wherein the mirror is an arcuate mirror, the source is a projector and the method further comprises:

pivoting the projector about a central axis of the arcuate mirror and pointing the projector at the arcuate mirror;

coordinating the pivoting of the projector with the sequences of the images from the project.

9. The method of claim 1 wherein an electro-optical scanner or an acusto-optic modulator is used to direct each of the images in the sequence of images to the different, characteristic location in the corresponding sequence of locations of the arcuate mirror.

* * * * *